United States Patent
Barenbrug (10) Patent No.: US 8,624,964 B2
(45) Date of Patent: Jan. 7, 2014

(54) DEPTH DEPENDENT FILTERING OF IMAGE SIGNAL

(75) Inventor: Bart Gerard Bernard Barenbrug, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1364 days.

(21) Appl. No.: 12/095,176

(22) PCT Filed: Nov. 27, 2006

(86) PCT No.: PCT/IB2006/054456
§ 371 (c)(1),
(2), (4) Date: Aug. 26, 2008

(87) PCT Pub. No.: WO2007/063477
PCT Pub. Date: Jun. 7, 2007

(65) Prior Publication Data
US 2009/0153652 A1 Jun. 18, 2009

(30) Foreign Application Priority Data
Dec. 2, 2005 (EP) .................................... 05111632

(51) Int. Cl.
H04N 13/04 (2006.01)
(52) U.S. Cl.
USPC ............................................. 348/54; 348/42
(58) Field of Classification Search
None
See application file for complete search history.

(56) References Cited

U.S. PATENT DOCUMENTS

| | | | |
|---|---|---|---|
| 4,925,294 A | | 5/1990 | Geshwind et al. |
| 5,148,502 A | * | 9/1992 | Tsujiuchi et al. ............. 382/255 |
| 5,537,144 A | * | 7/1996 | Faris ................................ 348/58 |
| 5,671,264 A | * | 9/1997 | Florent et al. .................. 382/260 |
| 5,684,890 A | * | 11/1997 | Miyashita et al. ............ 382/154 |
| 5,751,927 A | | 5/1998 | Wason |
| 5,914,728 A | | 6/1999 | Yamagishi et al. |
| 5,954,414 A | * | 9/1999 | Tsao ..................... 348/E13.035 |
| 6,166,720 A | | 12/2000 | Sim |
| 2002/0109701 A1 | | 8/2002 | Deering |
| 2003/0117489 A1 | | 6/2003 | Jones et al. |
| 2003/0234795 A1 | | 12/2003 | Lee |

FOREIGN PATENT DOCUMENTS

| | | | |
|---|---|---|---|
| EP | 1328129 A1 | | 7/2003 |
| EP | 1388817 A1 | * | 2/2004 |
| JP | 63308684 A | * | 12/1988 |
| JP | 6083955 A | | 3/1994 |
| JP | 3008681 | | 12/1999 |
| WO | WO 2004023348 A1 | * | 3/2004 |
| WO | WO2004039086 A2 | | 5/2004 |
| WO | WO2005027052 A1 | | 3/2005 |

\* cited by examiner

*Primary Examiner* — Jeffrey R Swearingen (57) ABSTRACT

A method and apparatus for rendering of image data for a multi-view display, such as image data for a lenticular autostereoscopic display, is disclosed. The method comprises the steps of receiving an image signal representing a first image, the first image comprising 3D image data, and spatially filtering the first image signal to provide a second image signal. The second image signal represents a second image, the spatial filtering being, e.g., a low-pass filter, a high-pass filter or a combination of a low-pass and a high-pass filter. A strength of the spatial filter is determined by a reference depth of the first image and a depth of an image element of the first image. The second image is sampled to a plurality of sub-images, each sub-image being associated with a view direction of the image.

13 Claims, 6 Drawing Sheets

DEPTH DEPENDENT FILTERING OF IMAGE SIGNAL

The invention relates to a method of rendering image data for a multi-view display. In particular the invention relates to a method of rendering image data for a multi-view display by means of a depth dependent spatial filter. The invention further relates to a multi-view display, to a signal rendering system and to computer readable code for implementing the method.

A multi-view display is a display capable of presenting to a viewer, different images depending upon the view direction, no that an object in an image may be viewed from different angles. An example of a multi-view display is an auto-stereoscopic display capable of presenting a viewer's left eye with a different image than the right eye. Various multi-view display technologies exist, one such technology is lenticular based. A lenticular display is a parallax 3D display capable of showing multiple images for different horizontal viewing directions. This way, the viewer can experience, e.g., motion parallax and stereoscopic cues.

One problem relating to multi-view displays is that images for different view-directions may overlap and thereby giving rise to ghost images, or cross-talk between images. Another problem relates to that the number of view-directions may be relatively small, typically eight or nine which may give rise to aliasing effects in some view-directions.

The published US patent application US 2003/0117489 discloses a three dimensional display and method of reducing crosstalk between left and right eye images of a 3D auto-stereoscopic display. The disclosed method of reducing crosstalk is based on adding a base level of grey to every pixel of both the left and right images so as to raise the background grey level.

The inventor of the present invention has appreciated that an improved method of rendering image data is of benefit, and has in consequence devised the present invention.

The present invention seeks to provide improved means for rendering image data for a multi-view display, and it may be seen as an object of the invention to provide an effective filtering technique that ameliorates the perceived image quality of a viewer, or user, of a multi-view display. Preferably, the invention alleviates, mitigates or eliminates one or more of the above or other disadvantages singly or in any combination.

According to a first aspect of the present invention there is provided, a method of rendering image data for a multi-view display, the method the comprising steps of:

receiving an image signal representing a first image, the first image comprising 3D image data, spatially filtering the first image signal to provide a second image signal, the second image signal representing a second image, the spatial filtering comprising a mapping between an image element of the first image and an image element of the second image, a strength of the spatial filter is determined by a reference depth of the first image and a depth of an image element of the first image, sampling the second image to a plurality of sub-images, each sub-image being associated with a view direction of the image.

In a multi-view display, the image data is typically rendered for proper presentation. The rendering may be needed since the image may be based on 2D image data projected to the viewer in such a way that the viewer perceives a spatial, or 3D, dimension of the image. For each view-direction of an image, a sub-image of the image as seen from that view-direction is generated, and the sub-images are projected into the associated view-direction.

The rendering process typically comprises several operations or steps, e.g. depending upon the input format of the image data, the display apparatus, the type of image data, etc. Image data of a first image is provided in a first step. This first step need not be a first step of the entire rendering process. The first image is typically in a format including image plus depth data, or an associated depth map may be provided with the image data, so that the 3D image data may be determined.

The inventor had the insight that spatial filtering for improving the perceived image quality, especially in terms of crosstalk and aliasing effect, is performed in the output domain, i.e. it is performed at a rendering stage where an input image has already been sampled, at least to some degree, for multi-view display. By spatially filtering the first image signal to provide a second image and the second image being sampled to a plurality of sub-images for multi-view, artefacts, such as crosstalk and aliasing effects, are dealt with in the input domain on a single image instead of in the output domain on a plurality of images, thereby dealing with artefacts in an efficient way.

While filtering a single image in the input domain rather than the multitude of images in the output domain, may be less perfect than the full-blown filtering of the multitude of images in the output domain, most artefacts may still be avoided or diminished, and a low-cost alternative in terms of processing power and time may thereby be provided.

Further advantages of the invention according to the first aspect include easy implementation in the rendering pipeline of images for multi-view display. The invention may be implemented in a separate pipeline step before the actual multi-view rendering, allowing for a more pipelined parallel implementation.

Furthermore, the method is effectively dealing with reduction of artefacts, such as crosstalk and aliasing artefacts, thereby rendering pre-processing or post-processing to further remove or diminish crosstalk or aliasing artefacts unnecessary.

Advantageous optional features include band-pass filtering done by low-pass filtering, high-pass filtering and/or a combination of the two, which are well-known band-pass filtering techniques that may be implemented in variety of ways, thereby ensuring robust and versatile implementation. In low-pass filtering, frequencies higher than the Nyquist frequency may be removed, whereas high-pass filtering amplifies high frequencies, e.g. the frequencies below the Nyquist frequency.

Additional advantageous optional features include mapping of the image element of the first image into a set of image elements of the second image and determining the strength of the spatial filter as a size of the set of image elements of the second image, such as a radius or extent of a distribution filter of the set of image elements. Thereby, it is ensured that objects near the reference plane are not greatly affected by the spatial filtering, whereas objects further away from the reference plane are affected by the spatial filtering.

Additional advantageous optional features include updating an image element of the second image with a visibility factor, whereby problems relating to mixing of foreground and background objects may be countered in an effective way. Such problems may arise when a spatial filtered image is rendered for a shifted viewpoint.

Additional advantageous optional features include updating the depth of the image elements of the second image, whereby an improved handling of viewpoint changes may be provided. The depth is updated by setting the depth of the image element of the second image to a value between the depth of the image element of the first image and the depth of the image element of the second image. In this way, when an image element of the second image would substantially be composed of foreground and only a little of background, the depth may be set to a value substantially towards the depth of the foreground, providing a gradual depth transition that softens the depth edge. In an embodiment the depth value may be set to the maximum of the depth of the image element of the first image and the depth of the image element of the second image.

Additional advantageous optional features include applying the spatial filter so that the image element of the first image and the set of image elements of the second image are aligned along a horizontal line of the first image, whereby effects of the coarse sampling in the view direction and crosstalk may effectively be countered for a multi-view display projecting the difference views in a plurality of horizontally orientated directions.

An additional advantageous optional feature includes use of the 2.5D video image format for the first image signal, since this is a standard and widely used format.

According to a second aspect of the invention is provided a multi-view display device comprising:

a display panel comprising an array of display elements, the display elements being arranged in groups, each group being associated with a view direction of an image, an optical element for directing light emitted from the display panel, so that light emitting from a group of display elements is directed into an angular distribution associated with the view direction of the group, an input module for receiving a first image signal, a rendering module for spatially filtering the first image signal to provide a second image signal, the second image signal representing a second image, the spatial filtering comprising a mapping between an image element of the first image and an image element of the second image, a strength of the spatial filter is determined by a reference depth of the first image and a depth of an image element of the first image, an output module for sampling the second image to a plurality of sub-images, each sub-image being associated with a view direction of the image.

Since the display device comprises a multi-view display device enhanced with the rendering method of the first aspect, it is an advantage of the present invention that the multi-view display device may be either a display device that initially includes the functionality according to the first aspect of the invention, or a display device to which the functionality according to the first aspect of the invention is subsequently added.

The input module, the rendering module and the output module may be provided as a signal rendering system according to the third aspect of the invention.

According to a fourth aspect of the invention, a computer readable code for implementing the method according to the first aspect is provided.

In general the various aspects of the invention may be combined and coupled in any way possible within the scope of the invention. These and other aspects, features and/or advantages of the invention will be apparent from and elucidated with reference to the embodiments described hereinafter.

Embodiments of the invention will be described, by way of example only, with reference to the drawings, in which

Figure 1:
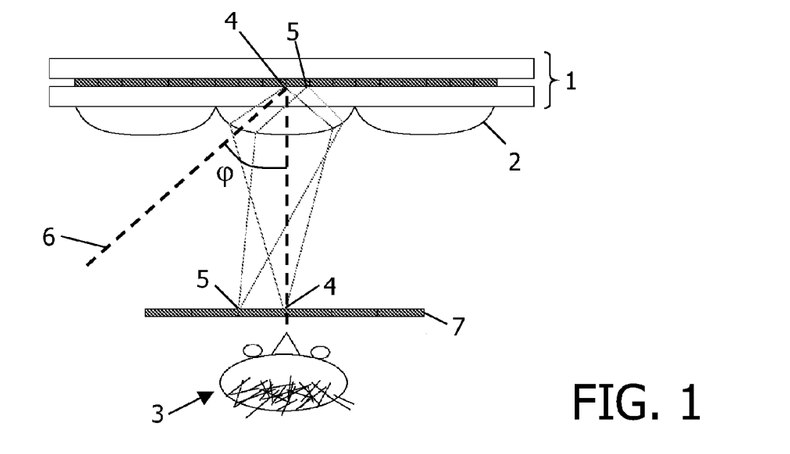
FIG. 1 illustrates the principle of a 3D lenticular display.

FIGS. 1 and 2 illustrate embodiments of a multi-view display, namely sketches of a 3D lenticular display as seen from the side (FIG. 1) and in top view (FIG. 2).

FIG. 1 illustrates the principle of a 3D lenticular display. A lenticular display is based on an LCD panel display 1, in front of which lenses 2 are attached. The lenses accommodate that for a specific viewing angle φ, the viewer 3 only sees a subset of the pixels of the underlying LCD. If appropriate values are set to the subset of pixels associated to the various viewing directions, the viewer will see different images from different viewing directions. So the viewer 3 sees a center view of the image, whereas the viewer would see a side view of the image from the view-angle denoted 6.

Each lens covers a number of pixels 4, 5 and projects them out, as illustrated by the number of pixels denoted 7. The viewer sees one subset of pixels 4 with the right eye and another subset of pixels 5 with the left eye. A 3D experience is thereby obtained.

Figure 2A:
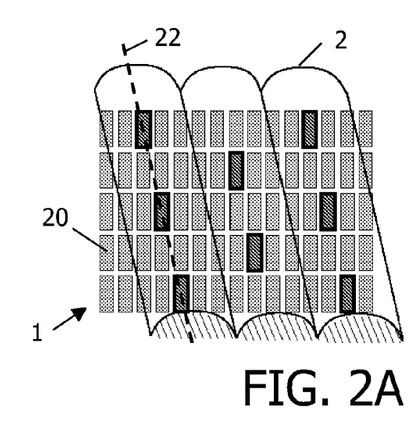
FIG. 2 shows a sketch of a lenticular display in top view.

FIG. 2A shows a sketch of lenticular display in top view. The display comprises an array of display elements 20 or pixels, such as a conventional LC matrix display panel, where the pixels are arranged in groups, each group being associated with a view direction of an image. Each group of pixel constitutes a sub-image, each sub-image being associated with a view direction. An optical element, i.e. the lenses, direct light emitted from the pixels so that light emitting from a group of pixels is directed into an angular distribution associated with the view direction of the group, thereby providing separate images to a viewer's eyes.

Figure 2B:
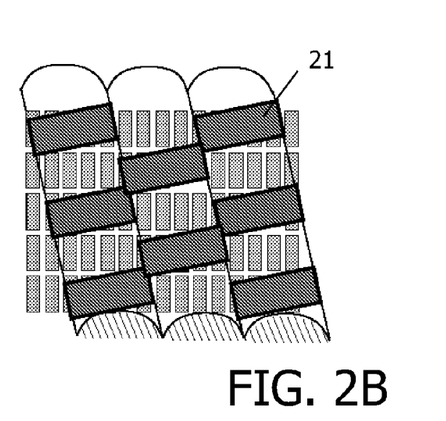

The lenticular lenses are in the illustrated embodiment arranged at a slight angle or slanted with respect to the columns of the pixels, so that their main longitudinal axis is at an angle with respect to the column direction of the display elements. In this configuration the viewer will see the points sampled along a direction 22 of the lens. In a nine-view display, nine images, one for each view direction, are concurrently computed and shown on the group of pixels associated with a sub-image. When a pixel is lit, the entire lens above the pixel is illuminated 21—this is shown in FIG. 2B—so that for a specific view direction it is the entire lens above the pixel that is seen emitting the color of that pixel.

FIGS. 1 and 2 describe a LCD-lenticular display; it is however to be understood that the invention is not limited to this type of display. For example, the invention may be applied with such displays as barrier-type displays, and the matrix display panel may be other than an LC panel, such as other forms of spatial light modulators, or other types of display panels such as electroluminescent or plasma panels.

Figure 3:
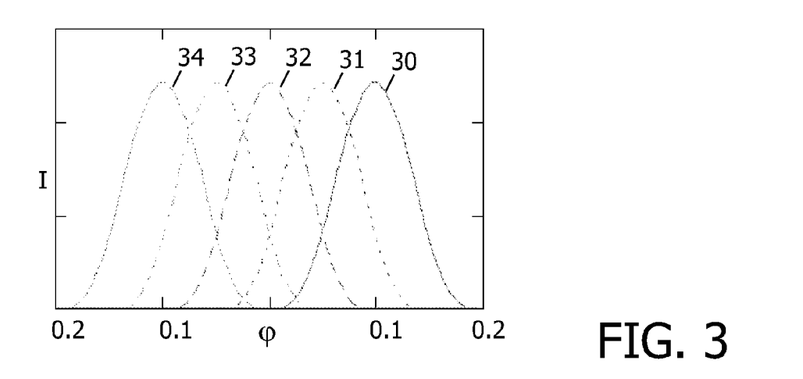
FIG. 3 illustrates crosstalk between sub-images from neighboring views.

The visibility of sub-images from neighboring views from a single viewing direction may cause artefacts such as crosstalk. This is illustrated in FIG. 3 showing the visible light, I, as a function of the view angle for a 4⅔-display, i.e. for a display where each lens cover 4⅔ pixels in the horizontal direction. It is seen that the angular distributions 30-34 from different sub-images overlap. The image perceived by a viewer is the sum of the light from each angular distribution and it may be seen that for this particular example, three sub-images contribute to the perceived image of each viewing direction.

The inventor of the present invention has appreciated that by appropriate spatial filtering problems relating to crosstalk, to ghost imaging and aliasing may be removed or at least diminished. Furthermore, by spatially filtering the input image before the image is rendered for multi-view display, only a single image needs to be filtered (and possible a depth map in accordance with certain embodiments), thereby providing an efficient way of handling spatial filtering of multi-view image data.

Depth dependent spatial filtering is done to counter crosstalk and/or aliasing effects. However, the depth dependent spatial filtering on an input image which is subsequently rendered for different viewpoints may introduce new artefacts by the rendering. For example, artefacts relating to foreground and background objects mix for the rendered images with shifted viewpoint, thereby diminishing the perceived image quality of the 3D image at the different viewpoints.

Figure 4:
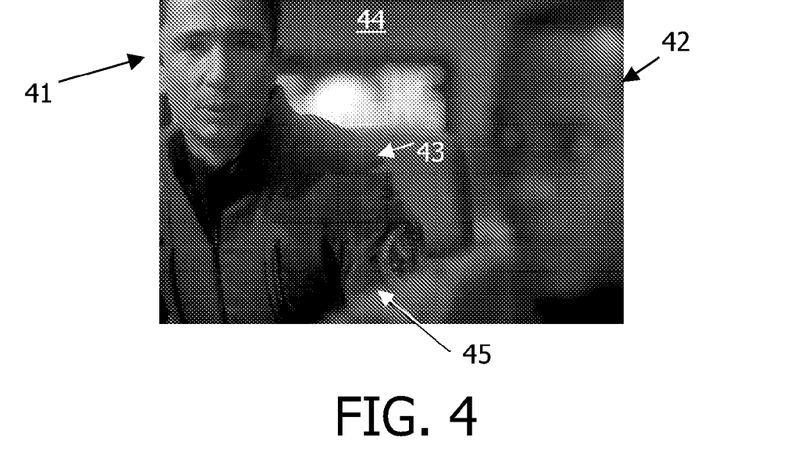
FIG. 4 illustrates an example of blurring of an image as a result of a camera focused at a particular depth.

In order to provide a 3D image with high perceived image quality, the depth dependent filtering of the image may be such that a blurring of the image is consistent with a blur introduced by a camera focused at a particular depth, this is illustrated in FIG. 4. The Figure shows a scene from the TV-series Star Trek Enterprise, showing two actors 41, 42 in front of a blurry background 44. The actor denoted 42 is also out of focus and as a consequence of this, blurred. Looking at the shoulder of the actor denoted 41 it is clear that background does not blur over foreground objects, as a sharp outline 43 of the shoulder is seen. The shoulder outline 45 of the actor denoted 42 is, however, blurred, showing that foreground objects do blur over background object. In an image rendering process, following these rules of what blurs over what in an image leads to an increased perceived spatial dimension in a 3D image.

The band-pass filter is typically a low-pass or a high-pass filter. The low-pass filter mitigates problems, typically alias problems, related to sampling the intensity function into a low number of sub-images, such as eight or nine, depending upon the number of views of the display. The high-pass filter mitigates problems relating to crosstalk imposing blur in the view direction. A combination of high-pass filtering and low-pass filtering may be performed to optimize the perceived image quality, or the filters may be applied separately.

Figure 5A:
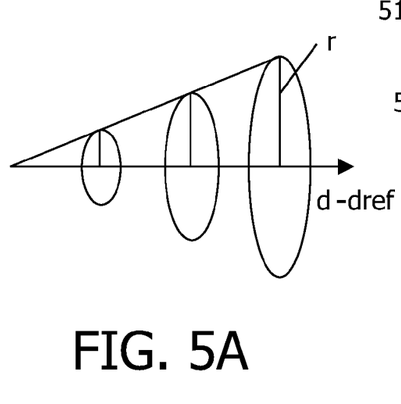
FIGS. 5A-5C illustrate an embodiment of a mapping of a first image to a second image in a spatial filtering process.
Figures 5B, 5C:
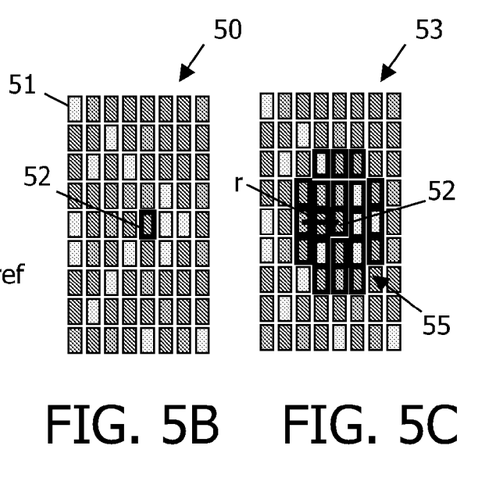

FIGS. 5A-5C illustrate an embodiment of a mapping of a first image to a second image in a spatial filtering process.

Firstly, an image signal representing a first image comprising 3D image data is received or provided. The 3D image data may be represented in any suitable coordinate representation. In a typical coordinate representation, the image is described in terms of a spatial coordinate set referring to a position in an image plane, and a depth of the image in a direction perpendicular to the image plane. It is, however, to be understood that alternative coordinate representations may be envisioned.

The filtering may be input-driven, and for each input pixel, the input pixel also being referred to as the source element, the difference in depth between the source element and a reference depth is determined. The reference depth being set to the depth layer in the image which is in focus, or which should remain in focus. The depth difference is then used as a measure for the strength of the spatial filter. The strength of the filter may be, in an embodiment, be the number of pixels affected by the intensity of the source element, i.e. as the size of the set of image elements of the second image. The size of the set of image elements may be the radius of a distribution filter, distributing the intensity of the source element to the set of destination elements. In the following, source element and destination element are alternatively referred to as source pixel and destination pixel, respectively.

FIG. 5A schematically illustrates the principle of using the difference between the depth of a given pixel and a reference depth, d−dref, as a measure of the radius, r, of a distribution filter. The same is illustrated in FIGS. 5B and 5C, but concretized with a section of a matrix display panel, such as a LCD display, comprising a number of image elements or pixels 51. A reference depth is set for the entire image, and for each pixel a depth of the pixel is determined. The intensity value of a pixel 52 is distributed in a set of pixels in the second image 53, the second image being an updated version of the first image 50 where, for all pixels 52, the intensity of the pixel is distributed to a set of pixel elements surrounding the pixel and the size of the set, or the radius, r, of the area 55 of the affected pixel, is determined from d−dref. The intensity of a pixel in the set of pixels 55 may be determined as Ip:=Ip+f(r)*Iq, where Ip is the intensity of the pixel, i.e. the output intensity that is accumulating, f(r) is the distribution function and Iq is the intensity of the source pixel at a distance r of the destination. The distribution filter may be a cubic b-spline.

For areas where the depth values are near the reference depth, the radius of the distribution filter is small, so destination pixels only receive contribution from the corresponding source pixel. For areas where the depth is much different from the reference value, source pixel intensities are distributed over large areas and the mix, resulting in a blur.

To generate a blur that is consistent with the blur introduced by cameras focused on a particular depth, a visibility factor, v, is multiplied by the distribution function, an that Ip:=Ip+f(r)*Iq*v. The visibility, factor equals zero when the destination pixel is much closer to the viewpoint than the source pixel, thereby ensuring that background does not blur over foreground. The visibility factor equals one when the source pixel is much closer to the viewpoint than the destination pixel, and has a gradual transition between the two values. The distances between the source pixel, the destination pixel and the viewpoint may be evaluated from the spatial coordinates of the source pixel, the destination pixel and the viewpoint, for example by comparing the distances between the source pixel and the viewpoint and between the destination pixel and the viewpoint to one or more minimum distances so as to determined when the source pixel is much closer than the destination pixel to the viewpoint, and vice versa. The visibility factor has the effect that destination colors have to be normalized according to the summation of weights, since the sum of weights cannot be held constant beforehand.

In the following embodiments relating to depth-dependent blur are addressed. A depth-dependent spatial filter can nevertheless be used to both depth-dependent blurring (low-pass filtering) and to depth dependent sharpening (high-pass filtering) which is discussed in connection with FIG. 12.

FIGS. 6 to 11 illustrate the effect of applying a depth filter in accordance with the present invention on a scene from the game Quake™.

Figure 6A:
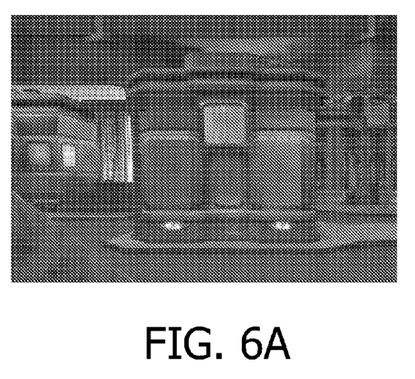
FIGS. 6A and 6B illustrate an example of a 2D input image with associated depth map.
Figure 6B:
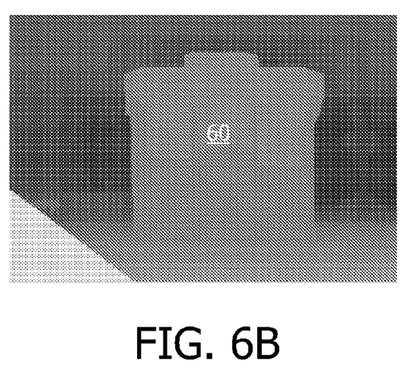

FIG. 6A illustrates the scene as used in the game, and FIG. 6B illustrates the depth map of the image (or scene). In the depth map, the grey-scale corresponds to disparity, so that bright objects are closer than dark objects. The reference depth is set to the pillar 60 in the middle. In the following images, the image of FIG. 6A is the first image to be mapped into a second image by a spatial filtering according to the present invention. The image of FIG. 6A in combination with the depth map of FIG. 6B is hereafter referred to as the source image. The second image may hereafter be referred to as the destination image.

Figure 7A:
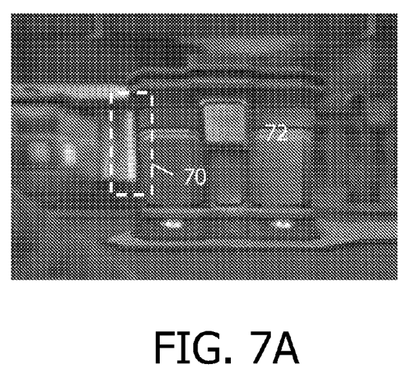
FIGS. 7A and 7B illustrate a depth dependent spatial filtering of the input image and a shifted view of the same image (or scene)
Figure 7B:
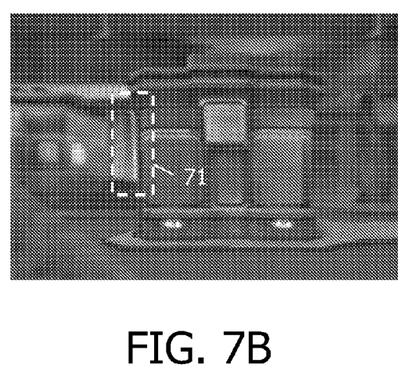

FIGS. 7A and 7B illustrate the depth-dependent blur without the visibility factor, FIG. 7A shows a blurring of the source image without the visibility factor, i.e. a destination image obtained without the visibility factor. The image of FIG. 7B is derived from the destination image of FIG. 7A for a shifted viewpoint using the depth map shown in FIG. 6B.

It is seen in FIG. 7A that the background is blurring over the foreground. This may e.g. be seen by the white background area which blurs over the pillar 70. This blurring has an effect for the shifted viewpoint (FIG. 7B), since some white area 71 may be seen even though it should not be visible from the specific view-angle. Blurring of background over foreground results in a halo-effect counteracting the occlusion.

Figure 8A:
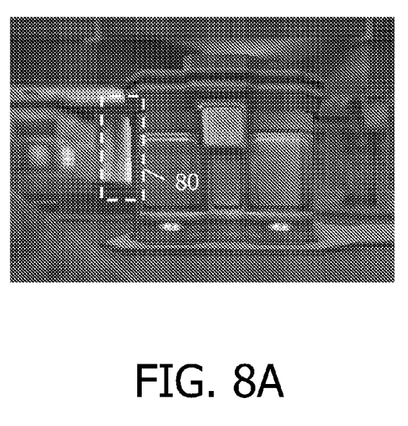
FIGS. 8A and 8B illustrate a depth dependent spatial filtering of the input image where a visibility factor has been applied and a shifted view of the filtered image.
Figure 8B:
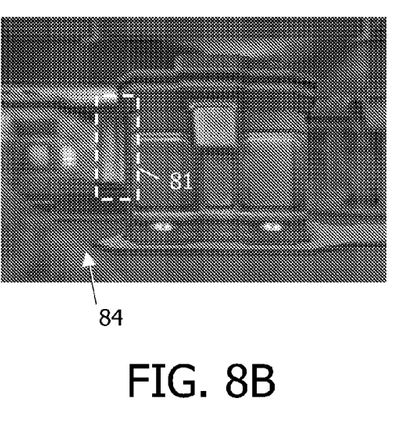

FIGS. 8A and 8B illustrate the depth-dependent blur with the visibility factor. FIG. 8A shows a blurring of the source image with the visibility factor, a destination image obtained with the visibility factor. The image of FIG. 8B is derived from the destination image of FIG. 8A for a shifted viewpoint, similar to FIG. 7B.

Both in the destination image (FIG. 8A) and the shifted viewpoint image (FIG. 8B) are the artefacts discussed in connection with FIGS. 7A and 7B removed. A sharp edge is obtained for the left side of the pillar 80, and the pillar occludes the white area in the shifted view 81.

However, the halo-artefacts remain for silhouettes where foreground blurs over background. The de-occlusion that occurs with the object at the lower left corner 84 is not just a repetition of a background color, but of a color which for a large part is made up of foreground color, i.e. a semi-transparency is introduced.

In a situation where additional viewpoints of an image are rendered from image plus depth information, different solutions exist for diminishing or even removing the halo-effects.

Figure 9A:
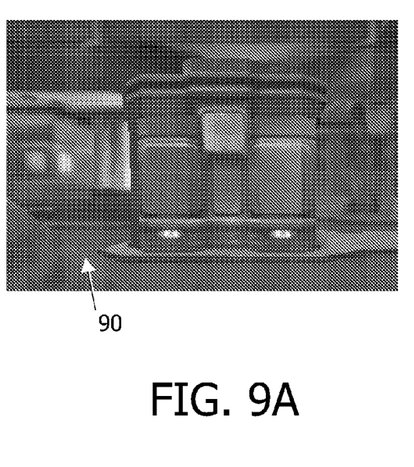
FIGS. 9A and 9B illustrate a depth dependent spatial filtering of the input image where an adjusted visibility factor has been applied and a shifted view of the filtered image.
Figure 9B:
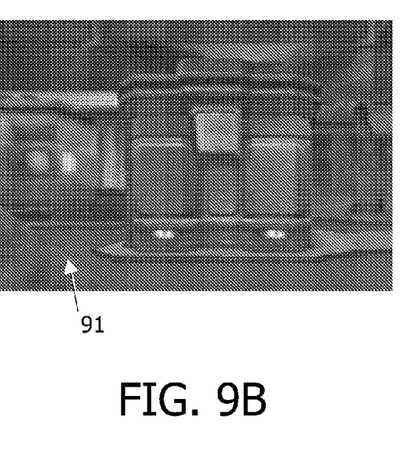

In an embodiment, the visibility factor is modified so that source pixels only contribute to destination pixels of similar depth. The result of such a filtering is shown in FIGS. 9A and 9B. It may be seen that the halo-effect is removed, but the sharp edge of the foreground object 90, 91 remains. Such sharp silhouette edges may result in double images due to crosstalk, even though the interior of the object is blurred.

In another embodiment, halo-effects are countered by filtering the depth map. The halo-effects 84 as seen in the lower left corner of FIG. 8B are largely due to foreground color being repeated, because the pixels that originally contained background colors only contain a lot of foreground color after the blurring. The halo-artefacts are enlarged when shifted views are computed, because a color which consists for a large part of foreground color is now used to fill in a de-occlusion area.

A solution, which at least reduces the artefacts considerably, is to also filter the depth map itself, thereby ensuring that the artefacts are not enlarged as much by the rendering.

Any destination pixel to which a foreground color is distributed, should also have foreground depth, thereby avoiding the use of such a pixel in the multi-view rendering to fill in de-occlusion areas. This can be done by applying a depth-dependent morphological filter: when a source pixel is distributed to a destination pixel, the depth of the destination pixel is set to the maximum of the depth of the source pixel and the previous depth of that destination pixel. This naturally follows the visibility criterion: depth information from background objects does not change depth information of foreground objects (which for example will keep the depth transitions of for example the pillar to its background sharp, both in color and in depth). In general, the updating of the depth map may be done by instead of setting the depth of the destination pixel to the maximum value as mentioned above, to set the depth of the destination pixel to a value between the depth of the source pixel and the depth of the destination pixel.

Figure 10A:
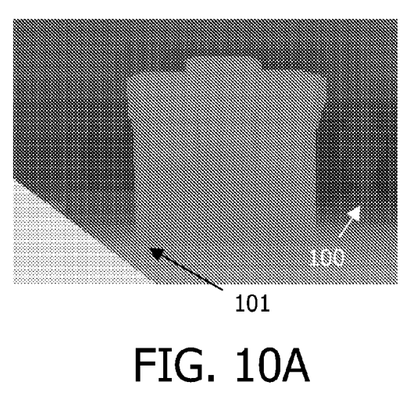
FIGS. 10A and 10B illustrate a spatially filtered depth map and depth dependent spatial filtering of the input image with the filtered depth map.

In a situation where the image filter blurs foreground over background, the depth map is updated with the foreground depth to extend the foreground object. The result is shown in FIG. 10A, showing the updated depth map. Comparing the depth map of FIG. 6B and the depth map of FIG. 10A, the dilation of the foreground objects is clear (the object in the lower left corner 101, but also in the background to the right of the pillar 100).

Figure 10B:
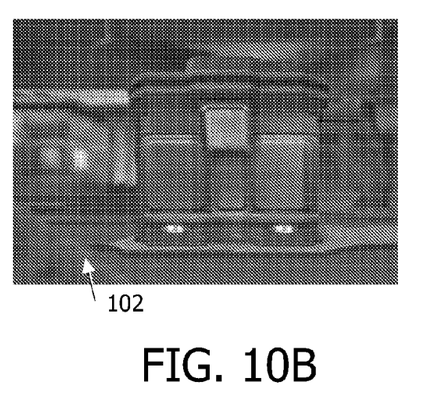

Using this filtered depth map, along with the filtered image from FIG. 8A results in the alternate view shown in FIG. 10B. Some halos 102 are still visible due to the semi-transparency of the blurred edges, which are now rendered at foreground depth, and also due to de-occlusions now being filled with color information originating from quite far from the edge, but by far not as severe as those depicted in FIG. 8B.

Figure 11A:
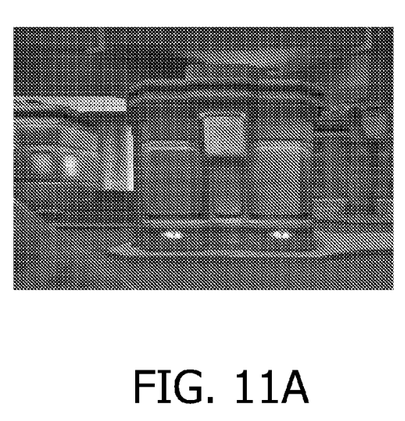
FIGS. 11A and 11B illustrate a depth dependent spatial filtering of the input image for a 1D situation and a shifted view of the filtered image.
Figure 11B:
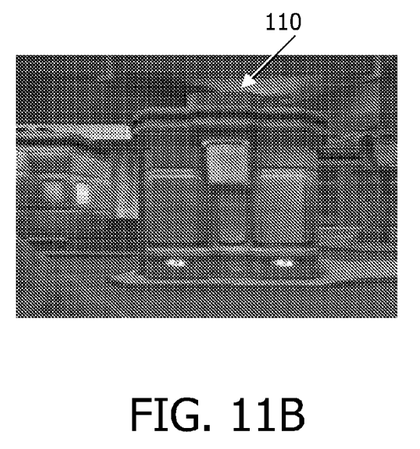

The spatial filtering as discussed in connection with FIGS. 5 to 10 is a 2D filtering in the sense that the set of destination pixels is a set of pixels in an image plane. Such 2D filtering may be necessary in order to mimic the out-of-focus blur of a real camera, and thereby improve the perceived image quality of a viewer. However, to counter effects of coarse sampling in the view direction as may be present on multi-view display devices, as well as crosstalk, a horizontal filter may suffice. In a horizontal filter, or a 1D filter, instead of the set of destination pixels being comprised within an area 55 as shown in FIG. 5C, the set of destination pixels extend along the horizontal direction on both sides of the source pixel. An example of an image and an image with a shifted viewpoint is shown in FIG. 11 for 1D horizontal depth dependent spatial filtering. As can be seen when comparing FIG. 11A to FIG. 6A, the horizontal blur has been applied. FIG. 11B shows the situation with a shifted viewpoint for a case where the depth map has been filtered, as in connection with FIGS. 10A and 10B. Also in the 1D situation large halo artefacts are prevented from appearing.

In horizontal filtering vertical halo-effects are avoided for shifted viewpoints. An example of a vertical halo-effect that is avoided in this situation may be seen by comparing the top of the pillar 110 in FIG. 11B and FIG. 7B. In FIG. 7B vertical halo-effects are introduced by the shifting of viewpoint.

A high-pass filtering is typically applied in order to pre-compensate blurring of an image introduced later on, e.g. in connection with the multi-view rendering or sampling of the image.

Figure 12A:
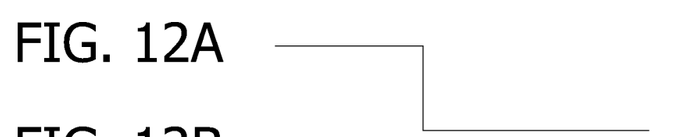
FIGS. 12A-12F illustrate aspects concerning the application of high-pass spatial filtering.
Figure 12B:
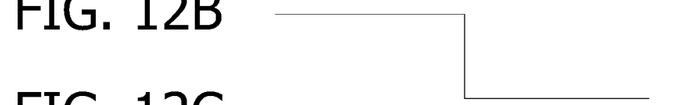
Figure 12C:
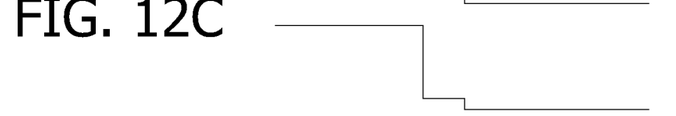

FIG. 12A schematically illustrates an input image with an edge. Multi-view rendering will shift this image, according to depth, so a second view will be a shifted version of the image (assuming constant depth in that area in this case). This is shown in FIG. 12B. On a multi-view display exhibiting crosstalk a viewer will not purely see one view (say view 1), but see a mix of the view one should see, and the neighboring views. As an example, FIG. 12C illustrates the situation where ⅛th of a neighboring view is seen, thus FIG. 12C illustrates the combination of ⅛th of a neighboring view (FIG. 12B) and ⅞th of the view itself (FIG. 12A). The edge is split over 2 smaller steps, i.e. the edge is blurred.

Figure 12D:
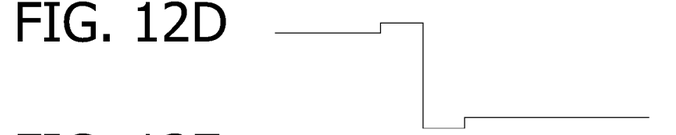
Figure 12E:
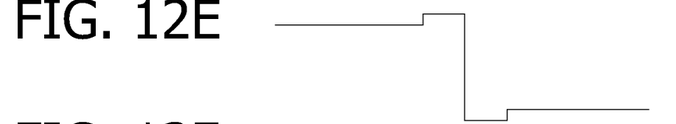
Figure 12F:
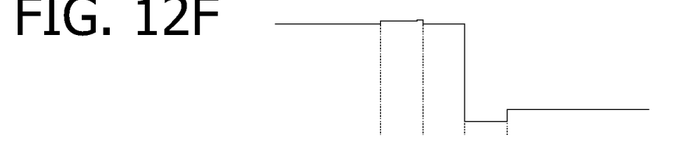

To counter this, the input image can be high-pass filtered, usually resulting in some overshoot before and after the edge, making the edge "higher". This is drawn schematically in FIG. 12D. FIG. 12E shows the shifted version of FIG. 12D, and FIG. 12E illustrates a situation where crosstalk has been introduced, i.e. FIG. 12F is the combination of FIG. 12E (the shifted view) and FIG. 12D (the original view). As shown, the edge is still sharp, despite the crosstalk.

For high-pass filtering areas which have a depth similar to the reference depth no or only little sharpening occurs, as the difference between the reference depth and the depth of the area increases, the radius, or extent, of the area affected by the sharpening increases, matching the distance between edges in neighboring views.

In an embodiment, the signal including the image data to be presented to the viewer is inputted into an input module, as a first image signal. The depth dependent spatial filtering of the first image to provide a second image is conducted at a rendering module, the rendering module typically being a processor unit. The input module, rendering module and output module, need not, but may, be separate entities.

The rendering module may also apply additional rendering functions to the image data, e.g. the image data may be properly scaled to the view resolution, colors may be adjusted, etc. The rendering of the image signal may be done separately for different color components and the view-dependent intensity function may be determined for at least one color component of the image, and the band-pass filtering applied to the at least one color component of the image. For example, since in an RGB-signal the green component is the most luminous component, the spatial filtering may in an embodiment only be applied for the green component.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practiced in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

Reference signs are included in the claims, however the inclusion of the reference signs is only for clarity reasons and should not be construed as limiting the scope of the claims.

The invention claimed is:

1. A method of rendering image data for a multi-view display (1), the method comprising the steps of:
   receiving a first image signal representing a first image (50) comprising 3D image data not rendered for multi-view display,
   spatially filtering the first image signal to provide a second image signal, the second image signal representing a second image (53), the spatial filtering comprising mapping an image element (52) of the first image to a set of one or more image elements (52, 55) of the second image, where a strength of the spatial filter is determined by a reference depth of the first image and a depth of the image element of the first image, said strength determining a size of the set of image elements, and
   sampling the second image to a plurality of sub-images, each sub-image being associated with a respective view direction of the image.

2. The method according to claim 1 where the spatial filter comprises a band-pass filter.

3. The method according to claim 2 where the band-pass filter is selected from a group consisting of a high-pass filter, a low-pass filter and a combination of a high-pass titter and a low-pass filter.

4. The method according to claim 1 where the strength of the spatial filter is a function of a difference between the depth of the image element of the first image and the reference depth of the first image.

5. The method according to claim 1 where a visibility factor is applied to at least one of the set of image elements of the second image, the visibility factor being determined from a distance between a viewpoint and a spatial coordinate of the image element of the first image and a distance between the viewpoint and a spatial coordinate of the at least one image element of the second image.

6. The method according to claim 5 where the visibility factor is equal to zero when the at least one image element of the second image is closer than the image element of the first image to a first minimum distance to the viewpoint, and where the visibility factor is equal to 1 when the image element of the first image is closer than the at least one image element of the second image to a second minimum distance to the viewpoint, and where the factor follows a gradually transition between the values of zero and one.

7. The method according to claim 1 where the depth of at least one of the set of image elements the second image is updated from an initial depth to a value between the initial depth and the depth of the image element of the first image, so that the sampling of the second image is done using the updated depth of the at least one image element of the second image.

8. The method according to claim 1 where the image element of the first image and the set of the one or more image elements of the second image are aligned along a horizontal line of the first image.

9. The method according to claim 1 where the first image signal has a 2.5D video image format.

10. The method of claim 1 where the reference depth represents a depth at which the first image is in focus.

11. A multi-view display device comprising:
a display panel (1) comprising an array of display elements (20, 51), the display elements being arranged in groups, each group being associated with a view direction ($\phi$) of an image,
an optical element (2) for directing light emitted from the display panel so that light emitted from a group of display elements is directed into an angular distribution (30-34) associated with the view direction of the group, said display device rendering image data for display by:
  receiving a first image signal representing a first image (50) comprising 3D image data not yet rendered for multi-view display;
  spatially filtering the first image signal to provide a second image signal, the second image signal representing a second image (53), the spatial filtering comprising mapping an image element (52) of the first image to a set of one or more image elements (52, 55) of the second image, where a strength of the spatial filter is determined by a reference depth of the first image and a depth of the image element of the first image, said strength determining a size of the set of image elements, and
  sampling the second image to a plurality of sub-images, each sub-image being associated with a respective view direction of the image.

12. A signal rendering system comprising at least one processor including:
  an input module for receiving a first image signal representing a first image (50) comprising 3D image data not yet rendered for multi-view display,
  a rendering module for spatially filtering the first mage signal to provide a second image signal, the second image signal representing a second image (53), the spatial filtering comprising mapping an image element (52) of the first image to a set of one or more image elements (52, 55) of the second image, where a strength of the spatial filter is determined by a reference depth of the first image and a depth of the image element of the first image, said strength determining a size of the set of image elements, and
  an output module for sampling the second image to a plurality of sub-images, each sub-image being associated with a respective view direction of the image.

13. A computer program embodied in a non-transitory computer-readable medium for effecting the performance of a method of rendering image data for a multi-view display, the method comprising the steps of:
  receiving a first image signal representing a first image comprising 3D image data not yet rendered for multi-view display,
  spatially filtering the first image signal to provide a second image signal, the second image signal representing a second image, the spatial filtering comprising mapping of an image element of the first image to a set of one or more image elements of the second image, where a strength of the spatial filter is determined by a reference depth of the first image and a depth of the image element of the first image, said strength determining a size of the set of image elements, and
  sampling the second image to a plurality of sub-images, each sub-image being associated with a respective view direction of the image.

* * * * *